United States Patent
Datar et al.

(10) Patent No.: US 10,200,852 B1
(45) Date of Patent: Feb. 5, 2019

(54) METHOD AND SYSTEM OF ENABLING ROAMING SERVICES IN A DATA-ONLY NETWORK TO A USER EQUIPMENT REQUIRING A DUAL ATTACHMENT TO PACKET AND CIRCUIT SWITCHED NETWORKS

(71) Applicant: Syniverse Technologies, LLC, Tampa, FL (US)

(72) Inventors: Prashant Datar, Tampa, FL (US); Edward Yau, Hong Kong (CN); Zidan Lian, San Jose, CA (US)

(73) Assignee: Syniverse Technologies, LLC, Tampa, FL (US)

( * ) Notice: Subject to any disclaimer, the term of this patent is extended or adjusted under 35 U.S.C. 154(b) by 0 days.

(21) Appl. No.: 16/111,949

(22) Filed: Aug. 24, 2018

Related U.S. Application Data

(60) Provisional application No. 62/549,520, filed on Aug. 24, 2017.

(51) Int. Cl.
| | |
|---|---|
| H04W 4/00 | (2018.01) |
| H04W 8/06 | (2009.01) |
| H04W 84/04 | (2009.01) |
| H04W 8/12 | (2009.01) |
| H04W 8/24 | (2009.01) |

(52) U.S. Cl.
CPC .............. *H04W 8/06* (2013.01); *H04W 8/12* (2013.01); *H04W 8/24* (2013.01); *H04W 84/042* (2013.01)

(58) Field of Classification Search
USPC ............. 455/433, 426.1, 507, 509, 436
See application file for complete search history.

(56) References Cited

U.S. PATENT DOCUMENTS

| | | | |
|---|---|---|---|
| 2012/0063414 A1 | 3/2012 | Ramachandran | |
| 2012/0076121 A1* | 3/2012 | Choi ..................... | H04W 36/08 370/338 |
| 2013/0288668 A1* | 10/2013 | Pragada ................ | H04W 12/06 455/426.1 |
| 2013/0308527 A1* | 11/2013 | Chin ................. | H04W 36/0022 370/328 |
| 2016/0057607 A1 | 2/2016 | Dubesset et al. | |
| (Continued) | | | |

OTHER PUBLICATIONS

Global Roaming Tutorial for LTE only Operators White Paper v1.0, GTI White Paper, Global TD-LTE Initiative, Nov. 1, 2016.

*Primary Examiner* — Joseph Arevalo
(74) *Attorney, Agent, or Firm* — Andriy Lytvyn; Smith & Hopen, P.A.

(57) ABSTRACT

A method and system of providing a roaming data service to a User Equipment (UE) that requires a dual attachment to a Packet Switched (PS) network for the data service and a Circuit Switched (CS) network for a voice service, but the visited network is a data-only PS network. When the UE sends a dual attach request, the visited network communicates with the home network via a Diameter Agent to obtain the UE's PS profile needed to complete attachment of the UE in the visited network for data services. To enable CS attach of the UE with the visited network, a custom function, titled a SGs-Agent, is deployed. The SGs-Agent provides a predefined CS profile to the visited network, thereby enabling the UE to complete the CS attach with the visited network. The visited network provides data services to the UE, but the voice services are denied.

18 Claims, 3 Drawing Sheets

(56) References Cited

U.S. PATENT DOCUMENTS

| | | | |
|---|---|---|---|
| 2016/0165432 A1* | 6/2016 | Dubesset | H04W 76/12 |
| | | | 455/433 |
| 2016/0262006 A1* | 9/2016 | Keller | H04W 8/10 |
| 2017/0034756 A1* | 2/2017 | Faccin | H04W 28/08 |
| 2017/0150420 A1* | 5/2017 | Olsson | H04L 41/5054 |
| 2018/0115549 A1* | 4/2018 | Chen | H04L 63/0892 |
| 2018/0160298 A1* | 6/2018 | Wang | H04W 4/70 |
| 2018/0191786 A1* | 7/2018 | Kunz | H04L 65/1016 |
| 2018/0213384 A1* | 7/2018 | Youn | H04W 4/90 |
| 2018/0234469 A1* | 8/2018 | Kim | H04W 8/06 |
| 2018/0310162 A1* | 10/2018 | Kim | H04W 8/04 |

\* cited by examiner

US 10,200,852 B1

METHOD AND SYSTEM OF ENABLING ROAMING SERVICES IN A DATA-ONLY NETWORK TO A USER EQUIPMENT REQUIRING A DUAL ATTACHMENT TO PACKET AND CIRCUIT SWITCHED NETWORKS

PRIORITY CLAIM

This non-provisional application claims priority to U.S. Provisional Patent Application No. 62/549,520 filed Aug. 24, 2017, entitled "GSM-LTE Device Roaming in LTE-Only Networks," which is incorporated herein by reference.

BACKGROUND OF THE INVENTION

1. Field of the Invention

This invention relates to roaming on a cellular network. More specifically, it relates to a method and a system of enabling roaming services to a subscriber that requires a dual attachment to data and voice networks, but the visited network is a data-only network.

2. Background

Many User Equipment (UE) devices are voice centric-devices that typically attach to both Long Term Evolution (LTE) data and Global System for Mobile Communications (GSM) voice networks simultaneously so as to avail of GSM voice service. Currently, most mobile network operators (MNOs) run LTE+GSM networks. UEs from such MNOs cannot roam to LTE-only or LTE+CDMA (code division multiple access) networks due to lack of GSM voice service infrastructure. This problem limits the in-bound roaming revenue of LTE-only and LTE+CDMA MNOs. This problem also makes out-bound roaming from LTE-only and LTE+CDMA MNOs onto LTE+GSM MNOs expensive due to the lack of reciprocal roaming service.

One solution to this problem involves deployment of Circuit Switch Fallback (CSFB) infrastructure in a visited LTE network. CSFB infrastructure is designed to allow voice and Short Message Services (SMS) services, which are Circuit Switched (CS) services, to remain available while the UE is attached to an LTE network. When a subscriber roams on a Visited Public Mobile Network (VPMN) having CSFB capabilities, the subscribers falls back to a 2G/3G network for voice calls and SMS messages. In the CSFB scheme, the UE changes its radio access technology from LTE to a 2G/3G technology that supports CS services.

CSFB scheme requires the VPMN to have legacy 2G/3G network components, namely a Mobile Switching Center (MSC) and Visitor Location Register (VLR), and a SGs interface between the Mobility Management Entity (MME) and the MSC. SGs Application Part (SGsAP) protocol messages are used on the SGs interface between the MME and the MSC to enable location management and to relay GSM-related messages associated with CS services. The basis for the interworking between an MSC and an MME is the existence of a SGs association between the entities per UE.

A major flaw of the CSFB solution is that it is cost-prohibitive for many Greenfield LTE MNOs. Also, MNOs that have invested resources into deployment of a CDMA network for voice services may be reluctant to invest additional resources into GSM network components required for CSFB. Thus, a more cost-effective and less complex alternative to CSFB is needed.

In many scenarios, roamers do not require voice and SMS services and only need data services. However, if an UE requires a dual connection to a Packet Switched (PS) and a Circuit Switched (CS) networks, the UE will not be able to attach to a PS network that lacks CS capability. Thus, what is need is a method and system that will enable UEs from a LTE+GSM HPMN to attach and to continue to stay attached to a Greenfield LTE or LTE+CDMA VPMNs that does not have Third Generation Partnership Program (3GPP) CS GSM voice infrastructure.

BRIEF SUMMARY OF THE INVENTION

The long-standing but heretofore unfulfilled need for enabling a User Equipment (UE) to roam in a Visited Public Mobile Network (VPMN), when the UE requires a dual attachment to a Packet Switched (PS) for data services and Circuit Switched (CS) network for voice services, but the VPMN is a data-only network without CS capabilities is now met by a new, useful, and nonobvious invention. In an embodiment, the PS network is a Long Term Evolution (LTE) network, and the CS network is Global System for Mobile Communications (GSM) network. In an embodiment, the VPMN is a Greenfield Long Term Evolution (LTE) network without Circuit Switch Fallback (CSFB) capabilities or an LTE+CDMA network. The HPMN network is a LTE+GSM network.

A Diameter Agent (DRA) is provided in communication with a MME of the VPMN and a Home Subscriber Server (HSS) of the HPMN. When UE powered-up in a geographic location serviced by VPMN, the UE sends an Attach Request for a dual attachment to PS and CS networks toward the MME. Responsive to receipt of the Attach Request, the MME sends an Update-Location-Request (ULR) for attachment to the PS network and a Location-Update (LU) request for attachment to the CS network.

The MME sends the ULR to the DRA over a Diameter S6a interface. The DRA then routes the ULR to the HSS. Responsive to a successful authorization of the UE to roam in the VPMN for the data service, the HSS sends an Update-Location-Answer (ULA) to the DRA, wherein the ULA contains a PS Profile for the UE. DRA routes the ULA to the MME.

The invention further includes a SGs-Agent in communication with the MME. Responsive to the Attach Request received from the UE, the MME sends the Location Update (LU) Request for attachment to the CS network to the SGs-Agent over a SGs interface. The LU request includes an International Mobile Subscriber Identity (IMSI) of the UE. The SGs-Agent examines the IMSI of the UE to establish whether the UE is eligible to roam in the VPMN. Responsive to determining that the UE is eligible to roam in the VPMN, the SGs Agent routes a LU Accept to the MME, wherein the SGs-Agent provides a predefined CS Profile within the LU Accept message.

The MME establishes the dual attachment of the UE in the VPMN using the UE's PS Profile received from the HPMN and the predefined CS Profile received from the SGs-Agent. The VPMN provides the data service to the UE but denies the voice service.

The DRA and SGs-Agent can be hosted on an IPX network or the VPMN itself.

If the UE sends an EMM Extended-Service-Request (EMM-ESR) NAS interface message to the MME in an attempt to make a Mobile Originated (MO) Call, the MME rejects the EMM-ESR message.

The SGs-Agent supports SGs Application Part (SGsAP) messages received from the MME, the SGsAP messages selected from the group consisting of: the LU Request, an EPS-Detach-Indication, an IMSI-Detach-Indication, and a Status message. The SGs-Agent is further configured to send SGsAP messages to the MME, the SGsAP messages selected from the group consisting of the LU-Accept, a LU-Reject, an EPS-Detach-Ack, an IMSI-Detach-Ack, and a Status message.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

In a mobile communications environment, a Mobile Station (MS) or User Equipment (UE), such as a cell phone, may communicate voice and/or data signals with one or more networks. The wireless communications between the UE and the networks may be performed with various wireless technologies, such as the Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, LTE-Advanced technology, and others.

This disclosure pertains to a scenario in which the UE that requires a dual attachment to a Packet Switched (PS) network (such as an LTE network) and Circuit Switched (CS) network (such as a GSM network), but the VPMN is a Greenfield LTE network or an LTE+CDMA network and does not support GSM. A person of ordinary skill in the art will understand that these types of networks are merely exemplary, and the disclosed method and system can be used in other scenarios involving different types of networks.

Figure 1:
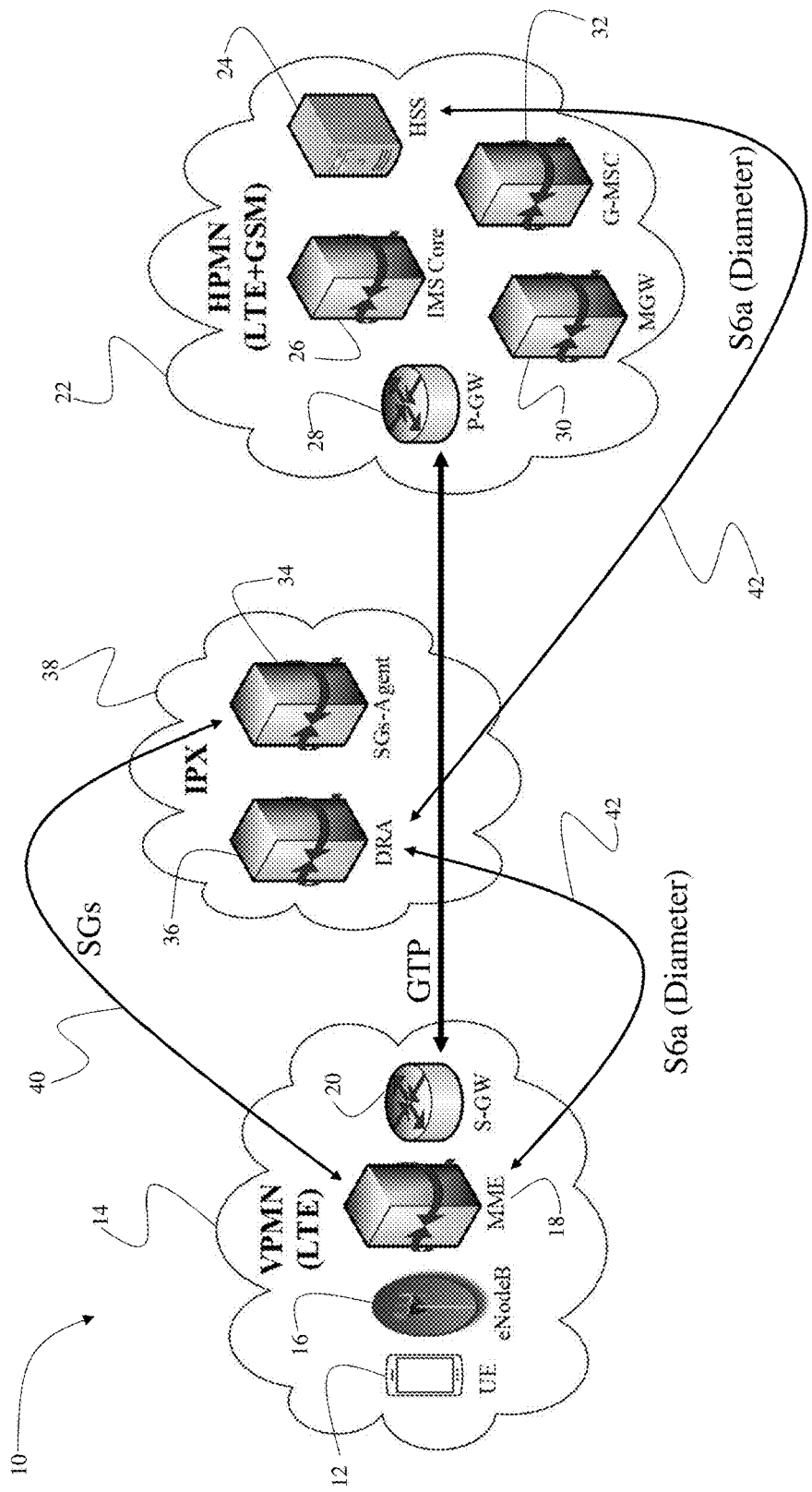
FIG. 1 is a diagram schematically depicting an embodiment of the invention.

Referring to FIG. 1, a UE 12 is located within a VPMN 14. VPMN 14 has an eNodeB 16, Mobility Management Entity (MME) 18, and a Serving Gateway (S-GW) 20. VPMN 14 is a PS network that does not have a CS network. In an embodiment, VPMN 14 is a Greenfield LTE without CSFB capability. In another embodiment, VPMN 14 is a LTE+CDMA network, without GSM support.

FIG. 1 depicts HPMN 22, to which UE 12 is subscribed. HPMN 22 has both a PS network for data services and a CS network for voice/SMS services. HPMN 22 has LTE network components including a Home Subscriber Server (HSS) 24, a IP Multimedia Core Network Subsystem (IMS Core) 26, and a Packet Data Network Gateway (P-GW) 28. HPMN 22 also has GSM network components including a Media Gateway (MGW) 30 and a Gateway Mobile Switching Center (G-MSC) 32.

Under standard roaming schemes, UE 12 would be unable to roam in VPMN 14 because VPMN 14 does have a GSM network and also does not have CSFB capabilities. Although VPMN 14 cannot provide voice services to UE 12, VPMN 14 has a capability to provide data services to UE 12 via its PS network. However, for this to be possible, UE 12 must be able to attach within VPMN 14—only then, UE 12 would be able to receive data service from VPMN 14, although voice and SMS services would be denied.

To enable UE 12 to attach within VPMN 14, a SGs Agent 34 and a Diameter Agent (DRA) 36 are deployed. SGs-Agent 34 and DRA 36 may be hosted by an IPX (IP Packet Exchange) network 38, as depicted in FIG. 1, or by VPMN 14 itself (not shown in the drawings). SGs-Agent 34 is a custom-built function configured to perform at least the following functions: (1) implementing an SGs interface 40 toward MME 18; and (2) providing a GSM CS Location-Update Accept to MME 18 for CS registration requests sent by MME 18 to SGs-Agent 34 from inbound roaming UEs 12 on VPMN 14.

In an embodiment, SGs-Agent 34 is coded in Java with a common Linux SCTP stack, which runs over Redhat Enterprise Linux OS. In this embodiment, SGs-Agent 34 supports virtualization. In an embodiment, SGs-Agent 34 does not store a state of UE 12, and, therefore, session database is not required. High availability may be provided with Linux Cluster manager with virtual IP failover.

In an embodiment, SGs interface 40 runs over SCTP, defined as per 3GPP TS 29.118. In this embodiment, SGs-Agent 34 emulates a Visited Location Register (VLR) and establishes SCTP associations with MME 18.

Since actual CSFB is not intended, SGs-Agent 34 does not need to support MAP-Location-Update procedure with a Home Location Register (HLR) of HPMN 22. SGs-Agent 34 also does not need to maintain SGs subscriber state as per TS 29.118 and does not need to support CS Paging procedure to UE 12 and SMS over SGs.

SGs-Agent 34 supports the following SGsAP message types:
SGsAP-Location-Update-Request (MME to SGS-Agent);
SGsAP-Location-Update-Accept (SGS-Agent to MME);
SGsAP-Location-Update-Reject (SGS-Agent to MME);
SGsAP-EPS-Detach-Indication (MME to SGS-Agent);
SGsAP-EPS-Detach-Ack (SGS-Agent to MME);
SGsAP-IMSI-Detach-Indication (MME to SGS-Agent);
SGsAP-IMSI-Detach-Ack (SGS-Agent to MME);
SGsAP-Status (MME to SGS-Agent/SGS-Agent to MME).

Per above disclosure, SGs-Agent 34 enables UE 12 to register for—but not receive—GSM voice services, even when VPMN 14 lacks a CS network. Although SGs-Agent 34 enables UE 12 to register with VPMN 14, VPMN 14 will deny any GSM voice service that may be requested by UE 12. Voice services can continue to be provided using Voice over LTE (VoLTE) S8 Home Roaming (S8HR) roaming on the LTE network of VPMN 14. Users can also continue using Over The Top (OTT) voice applications that only require a data connection.

Attachment Procedure

Figure 2:
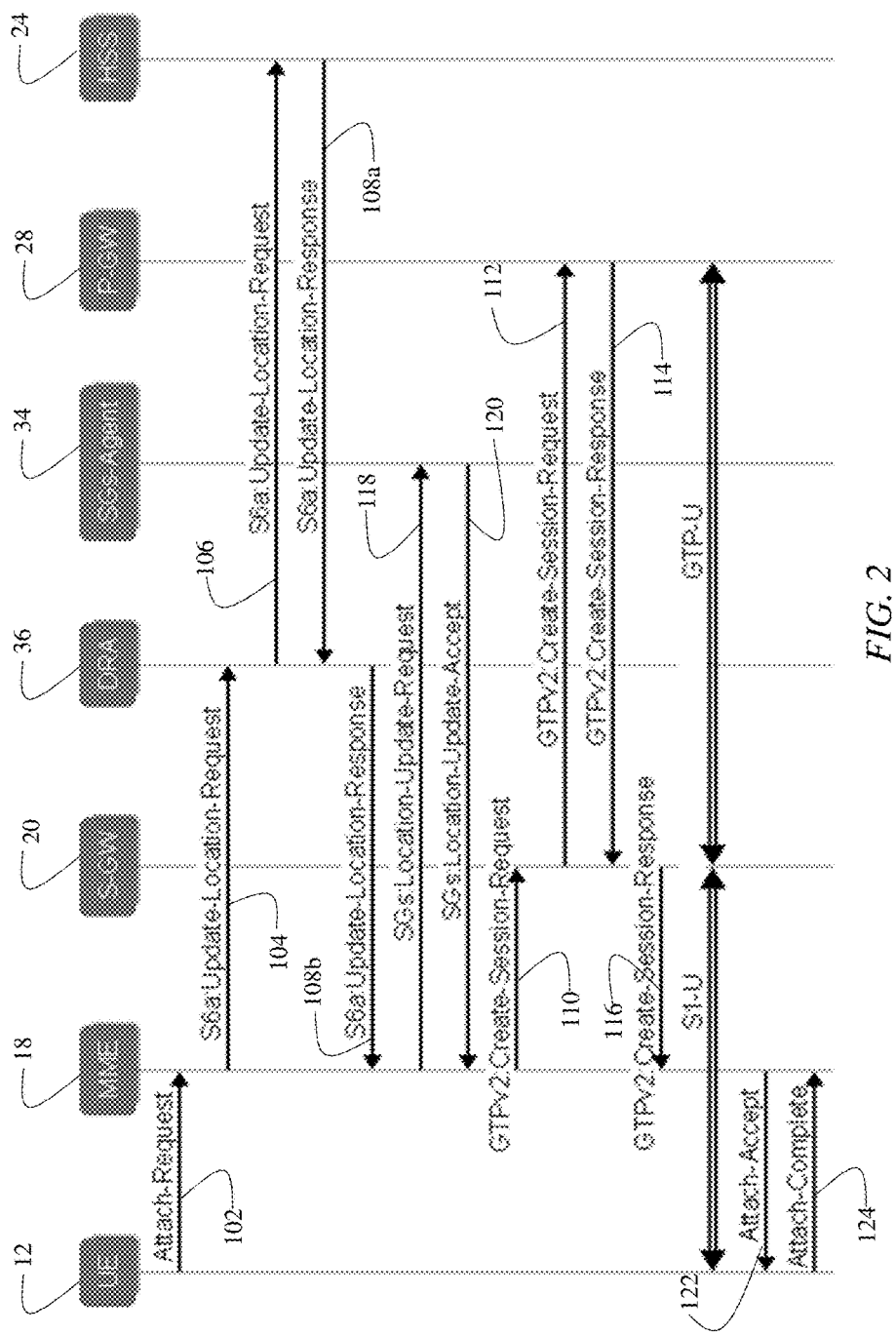
FIG. 2 is a signaling flow diagram depicting the attachment procedure of the UE with the VPMN according to an embodiment of the invention.

FIG. 2 illustrates an exemplary attachment procedure according to an embodiment of the invention. When UE 12 is first powered-up in a geographic location serviced by VPMN, in step 102, UE 12 send to MME 18 an attach request for a dual PS and CS network attachment. In FIG. 2, the PS network attach is performed in steps 102-116, and the CS network attach in steps 118-124.

If a valid LTE roaming agreement exists between VPMN 14 and HPMN 22, MME 14 sends an ULR message towards HSS 24 over a Diameter S6a interface 42. Since UE 12 does not belong to VPMN 14, the ULR is routed toward DRA 36 in step 104. In step 106, DRA 36 routes the ULR to HSS 24 in HPMN 22 based on either the Destination-Realm value on the ULR or the International Mobile Subscriber Identity (IMSI) value on the ULR. HSS 24 verifies whether UE 12 is authorized to roam into VPMN 12. Responsive to a successful verification, HSS 24 returns UE 12's PS Profile (LTE Profile) in the UPDATE-LOCATION-ANSWER (ULA) to MME 18 via DRA 36 in steps 108a and 108b.

MME 18 looks up P-GW 28's IP for the access point name (APN) to be used for the default bearer and, in step 110, sends a GTPv2 CREATE-SESSION-REQUEST to S-GW 20. In step 112, S-GW 20 routes this request to P-GW 28. In step 114, P-GW 28 replies to S-GW 20 with the CREATE-SESSION-RESPONSE. In step 116, S-GW 20 sends this message back to MME 18, and MME 18 sets up the data bearers on the access side. At this point the attachment of UE 12 to PS network (LTE attach) is complete.

Because the UE has requested a CS network attach in addition to PS network attach, MME 18 sends the CS LU Request to SGs-Agent 34 over SGs interface 40 in step 118. Upon receiving the LU Request, SGs-Agent examines the IMSI of UE 12 and determines whether the inbound subscriber is eligible to roam in VPMN 14. If verification is successful, then, in step 120, SGs-Agent 34 returns a CS LU ACCEPT message and a predefined CS profile, which enables UE 12 to attach and stay connected to VPMN 14. In step 122, MME 18 confirms the completion of the dual attach to the UE and, in step 124, UE 12 acknowledges the same. At this point the UE 12's dual attach to PS and CS networks is completed. UE 12'ts data connection is now active and UE 12 can begin using roaming data services in VPMN 12.

Denial of Voice Service

Figure 3:
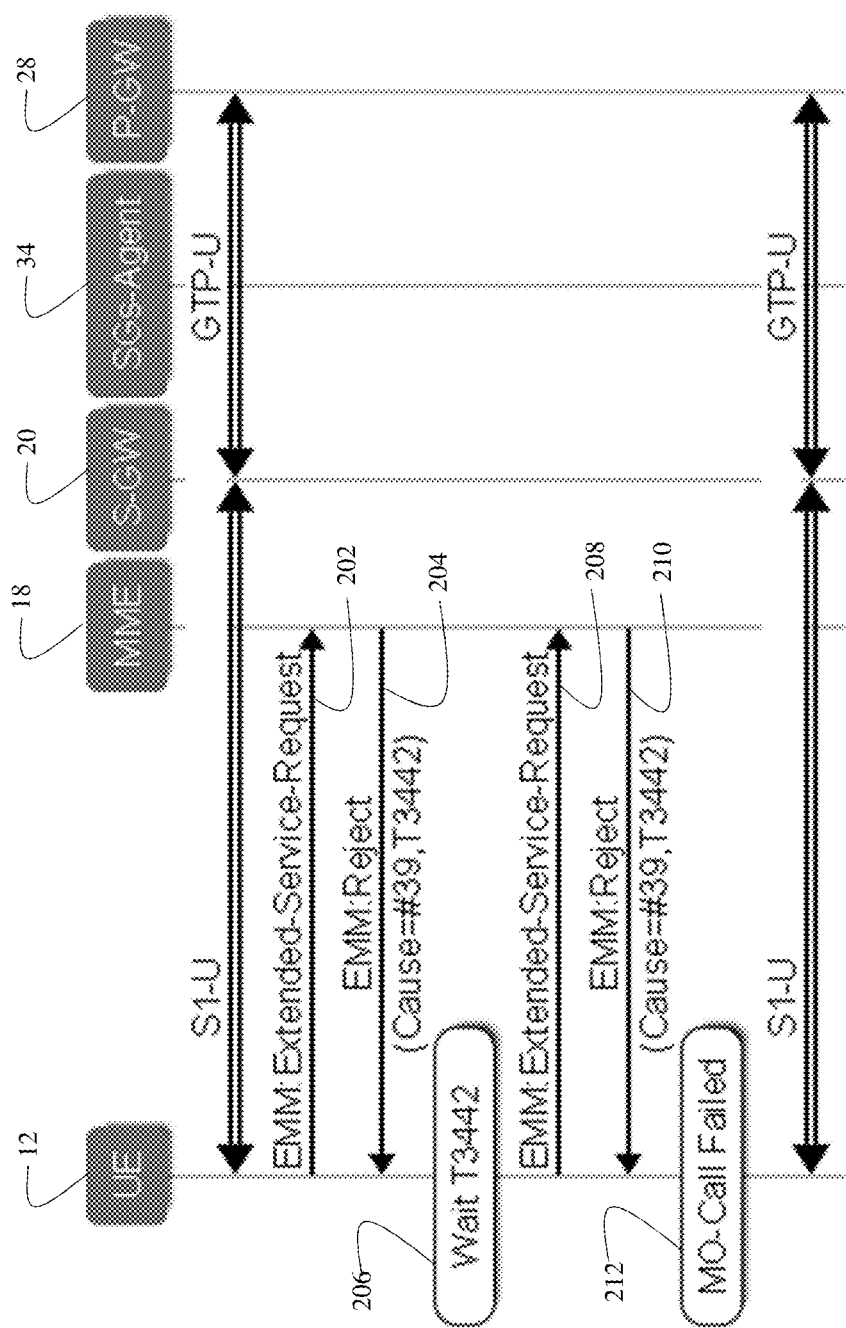
FIG. 3 is a signaling flow diagram depicting the procedure for rejecting mobile-originated calls from the UE while it is roaming with the VPMN.

Referring to FIG. 3, if the subscriber inadvertently dials a phone number when VoLTE service is not available, then UE 12 detects this action and sends an EMM EXTENDED-SERVICE-REQUEST (EMM-ESR) NAS (Non-Access Stratum) interface message to MME 18 in step 202, as a part of CSFB signaling for a Mobile Originated (MO)-Call. Because VPMN 14 only provides data services, MME 18 is configured to reject this EMM-ESR with Cause #39 (CS service temporarily not available) in step 204. MME 18 also sends a value to be used by UE 12 for Timer 3442 (T3442) as part of the NAS Reject message. When UE 12 receives this NAS Reject, UE 12 begins to count down T3442 in step 206. At the end of T3442, UE 12 retries the EMM-ESR for the MO-Call in step 208. In step 210, MME 18 again rejects the EMM-ESR. At this point, the UE displays a Call-Failed message to the subscriber in step 212 with an option to re-try the call. Since, the subscriber knows that the service is data-only, and the call was dialed by mistake, no further action is taken and the LTE data service continues uninterrupted.

Since SGs-Agent 34 does not register UE 12 back to HPMN 22's HLR for GSM voice services, it is not possible for Mobile Terminated (MT)-Calls to be routed towards UE 12. As such, there is no GSM MT voice service available to the subscriber.

The embodiments of the invention described above would be beneficial to MNOs that run LTE-only or LTE+CDMA networks. Such MNOs can boost their in-bound roaming revenues by implementing the disclosed method/system. These MNOs may also be able to negotiate lower out-bound roaming rates on GSM networks because they will be able to use the disclosed method/system to provide in-bound roaming services to their GSM partners.

Hardware and Software Infrastructure Examples

The present invention may be embodied on various computing platforms that perform actions responsive to software-based instructions. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It should be noted that when referenced, an "end-user" is an operator of the software as opposed to a developer or author who modifies the underlying source code of the software. For security purposes, authentication means identifying the particular user while authorization defines what procedures and functions that user is permitted to execute.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. A method of providing a data service in a Visited Public Mobile Network (VPMN) to a User Equipment (UE) that requires a dual attachment to a Packet Switched (PS) network for the data service and a Circuit Switched (CS) network for a voice service, wherein the VPMN lacks the CS network, the method comprising:
   providing a SGs-Agent in communication with a Mobility Management Entity (MME) of the VPMN;
   receiving, by the MME, an Attach Request from the UE for the dual attachment to the PS and CS networks;
   routing an Update-Location-Request (ULR) for attachment to the PS network to a Home Public Mobile Network (HPMN);
   wherein the ULR is routed over a Diameter S6a interface;
   responsive to a successful authorization of the UE to roam in the VPMN for the data service, routing an Update-Location-Answer (ULA) from the HPMN to the VPMN, N\herein the HPMN provides a PS Profile for the UE;
   routing a Location-Update (LU) Request for attachment to the CS network to the SGs-Agent, the LU Request carrying an International Mobile Subscriber Identity (IMSI) of the U E, wherein the LU request is not routed to the HPMN;
   examining, by SGs-Agent, the IMSI of the UE to establish whether the UE is eligible to roam in the VPMN;
   responsive to determining that the UE is eligible to roam in the VPMN, routing a LU Accept message from the SGs-Agent to the MME, wherein the SGs-Agent provides a predefined CS Profile within the LU Accept message;
   establishing the dual attachment of the UE in the VPMN using the UE's PS Profile provided by the HPMN and the predefined CS Profile provided by the SGs-Agent;
   confirming, at the MME and the UE, completion of the dual attachment of the UE, whereby the VPMN provides the data service to the UE but denies the voice service.

2. The method of claim 1, wherein the LU request is routed over a SGs interface.

3. The method of claim 1, wherein the VPMN is a Greenfield LTE network without Circuit Switch Fallback (CSFB) capabilities or a LTE+Code-Division Multiple Access (CDMA) network.

4. The method of claim 1, wherein the CS network is a Global System for Mobile Communications (GSM) network.

5. The method of claim 1, wherein the HPMN is a LTE+GSM network.

6. The method of claim 1, wherein the SGs-Agent is hosted on an IPX network or the VPMN.

7. The method of claim 1, wherein responsive to the UE sending an EMM Extended-Service-Request (EMM-ESR) NAS interface message to the MME in an attempt to make a Mobile Originated (MO) Call, the MME rejects the EMM-ESR message.

8. The method of claim 1, wherein the SGs-Agent supports SGs Application Part (SGsAP) messages received from the MME, the SGsAP messages selected from the group consisting of: the LU Request, an EPS-Detach-Indication, an IMSI-Detach-Indication, and a Status message.

9. The method of claim 1, wherein the SGs-Agent is configured to send SGs Application Part (SGsAP) messages to the MME, the SGsAP messages selected from the group consisting of the LU-Accept, a LU-Reject, an EPS-Detach-Ack, an IMSI-Detach-Ack, and a Status message.

10. A system for enabling a User Equipment (UE) to roam in a Visited Public Mobile Network (VPMN), wherein, to roam in the VPMN, a dual attachment of the UE to a Packet Switched (PS) network and a Circuit Switched (CS) network is required, but the VPMN lacks the CS network, the system comprising:
   a Diameter Agent (DRA) in communication with a Mobility Management Entity (MME) of the VPMN and a Home Subscriber Server (HSS) of the HPMN, the DRA configured to execute the steps comprising:
   receiving, from the MME, an Update Location Request (ULR) for attachment to the PS network for a data service, wherein the MME sends the ULR responsive to an Attach Request from the UE for the dual attachment to the PS and CS networks;
   wherein the ULR is routed over a Diameter S6a interface;
   routing the ULR to the HSS;
   responsive to a successful authorization of the UE to roam in the VPMN for the data service, receiving an Update-Location-Answer (ULA) from the HSS, wherein the ULA contains a PS Profile for the UE; and
   routing the ULA to the MME;
   a SGs-Agent in communication with the MME, the SGs-Agent configured to execute the steps comprising:
   receiving, from the MME, a Location Update (LU) Request for attachment to the CS network for a data service, an International Mobile Subscriber Identity (IMSI) of the UE being included in the LU Request;

examining the IMSI of the UE to establish whether the UE is eligible to roam in the VPMN; and responsive to determining that the UE is eligible to roam in the VPMN, sending a LU Accept message from the SGs-Agent to the MME, wherein the SGs-Agent provides a predefined CS Profile within the LU Accept message;

wherein, the MME establishes the dual attachment of the UE in the VPMN using the UE's PS Profile received from the HPMN and the predefined CS Profile received from the SGs-Agent, whereby the VPMN provides the data service to the UE but denies the voice service.

11. The system of claim 10, wherein the LU request is routed over a SGs interface.

12. The system of claim 10, wherein the VPMN is a Greenfield Long Term Evolution (LTE) network without Circuit Switch Fallback (CSFB) capabilities or a LTE+ Code-Division Multiple Access (CDMA) network.

13. The system of claim 10, wherein the CS network is a Global System for Mobile Communications (GSM) network.

14. The system of claim 10, wherein the HPMN is a LTE+GSM network.

15. The system of claim 10, wherein the DRA and SGs-Agent are hosted on an IPX network or the VPMN.

16. The system of claim 10, wherein responsive to the UE sending an EMM Extended-Service-Request (EMM-ESR) NAS interface message to the MME in an attempt to make a Mobile Originated (MO) Call, the MME rejects the EMM-ESR message.

17. The system of claim 10, wherein the SGs-Agent supports SGs Application Part (SGsAP) messages received from the MME, the SGsAP messages selected from the group consisting of: the LU Request, an EPS-Detach-Indication, an IMSI-Detach-Indication, and a Status message.

18. The system of claim 10, wherein the SGs-Agent is configured to send SGs Application Part (SGsAP) messages to the MME, the SGsAP messages selected from the group consisting of the LU-Accept, a LU-Reject, an EPS-Detach-Ack, an IMSI-Detach-Ack, and a Status message.

\* \* \* \* \*